(12) United States Patent
Baker

(10) Patent No.: US 6,205,041 B1
(45) Date of Patent: Mar. 20, 2001

(54) POWER SUPPLY FOR ELECTRONIC THERMOSTAT

(75) Inventor: Thomas C. Baker, Fort Wayne, IN (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 09/362,827

(22) Filed: Jul. 28, 1999

(51) Int. Cl.[7] .................................................. H02M 7/04
(52) U.S. Cl. .............................................. 363/86; 315/160
(58) Field of Search ........................... 363/86, 85, 131, 363/128, 124, 17, 45; 323/288, 243, 266, 236; 307/31; 315/160; 219/501, 497; 236/46 R

(56) References Cited

U.S. PATENT DOCUMENTS

| 3,585,444 | * | 6/1971 | Crowley | 315/160 |
|---|---|---|---|---|
| 4,456,871 | * | 6/1984 | Stich | 323/217 |
| 4,632,303 | | 12/1986 | Rodittis | 236/10 |
| 4,775,100 | | 10/1988 | Gouldey et al. | 236/46 |
| 4,776,514 | | 10/1988 | Johnstone et al. | 236/78 |
| 4,948,044 | | 8/1990 | Cacciatore | 236/46 R |
| 5,467,921 | | 11/1995 | Shreeve et al. | 236/78 R |
| 5,687,068 | | 11/1997 | Jamieson et al. | 363/126 |

* cited by examiner

*Primary Examiner*—Peter S. Wong
*Assistant Examiner*—Rajnikant B. Patel

(57) ABSTRACT

A power supply circuit for an electronic thermostat includes a half wave rectifier, at least one voltage dropping resistor and a gated rectifier. The gated rectifier preferably conducts only when the voltage at its output drops below the voltage at its gate. The voltage at the gate is defined by gating circuitry downstream of the voltage dropping resistors. The intermittent conduction of the silicon controlled rectifier produces less current flow through voltage dropping resistors within the power supply circuit. This causes less heat dissipation by these resistors within the thermostat.

12 Claims, 3 Drawing Sheets

POWER SUPPLY FOR ELECTRONIC THERMOSTAT

BACKGROUND OF THE INVENTION

This invention relates to wall mounted electronic thermostats and, in particular, to power supplies for such thermostats.

Wall mounted electronic thermostats for controlling temperatures in rooms are well known. These devices are commonly powered by batteries or by low voltage alternating current sources, typically 24 volts AC. The 24 volt AC power must be reduced to a lower level DC voltage for use in supplying power to the various component parts of the thermostat. This has heretofore been accomplished by various power supply circuits, which employ resistors to reduce the voltage level. These voltage dropping resistors dissipate heat which in turn can impact the sensing of room temperature by the thermostat. These resistors also produce additional loads on the transformer, which provides the stepped down 24 volts AC to the thermostat.

SUMMARY OF THE INVENTION

It is an object of the invention to provide an electronic thermostat with a power supply circuit that substantially reduces the amount of heat produced by the power supply circuit in stepping down the voltage through the voltage dropping resistors.

The above and other objects are achieved by a power supply circuit, which includes a half wave rectification of the 24 volt AC signal. Resistors downstream of the half wave rectification significantly drop the voltage of the half wave signal. In accordance with the invention, a gated rectifier is located downstream of the voltage dropping resistors. The gated rectifier is preferably a silicon controlled rectifier. The silicon controlled rectifier is operative to conduct only when the output voltage from the silicon controlled rectifier drops below a voltage at the gate of the silicon controlled rectifier. The voltage at the gate of the silicon controlled rectifier is defined by certain gating circuitry. The current flowing through the silicon controlled rectifier when it is conducting preferably charges a capacitor connected to the output of the silicon controlled rectifier. The voltage preferably defined by the capacitor at the output of the silicon controlled rectifier is the voltage that is applied to the various elements of the electronic thermostat. The current flowing through the voltage dropping resistors drops off when the silicon controlled rectifier does not conduct. This eliminates the dissipation of heat in these resistors that would otherwise occur if current were constantly flowing through the silicon controlled rectifier.

BRIEF DESCRIPTION OF THE DRAWINGS

Other objects and advantages of the present invention will be apparent from the following description in conjunction with the accompanying drawings, in which.

DESCRIPTION OF THE PREFERRED EMBODIMENT

Figure 1:
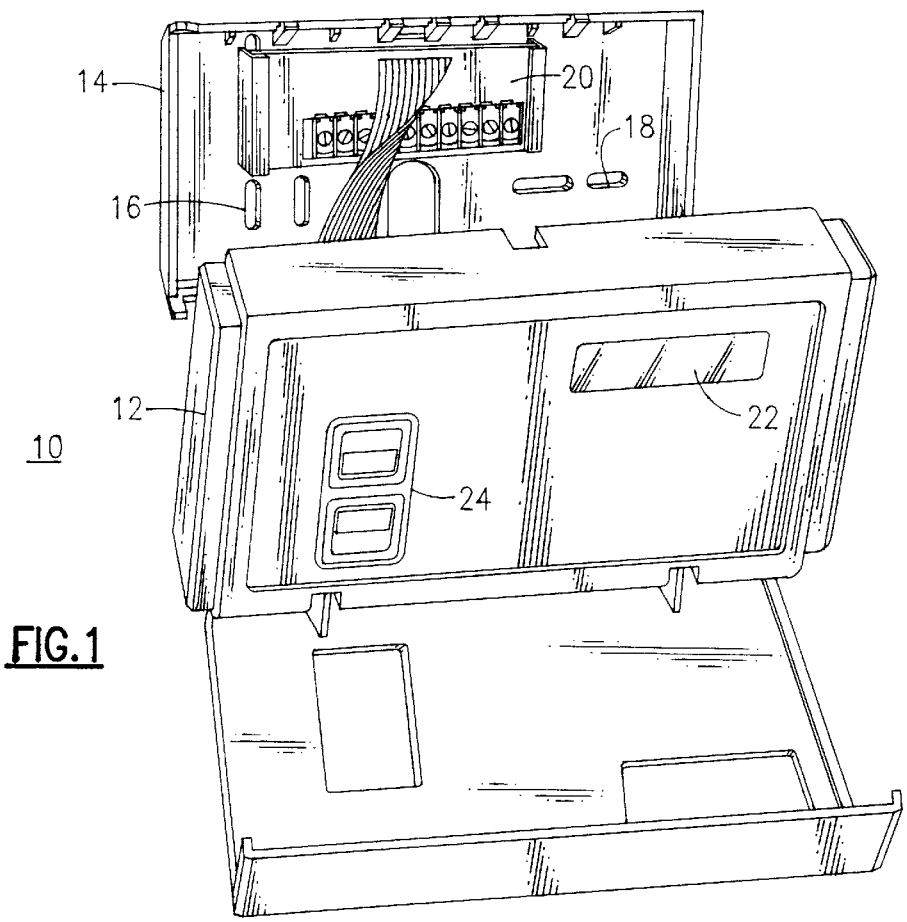
FIG. 1 illustrates a wall mounted electronic thermostat having a back end portion with electrical connections to an alternating current power source.

Referring to FIG. 1, a programmable electronic thermostat 10 is seen to comprise a main body portion 12 and a back end portion 14. The back end portion 14 is normally attached to a wall via slots 16 and 18. The main body portion 12 preferably mounts to the back end portion 14 after it is attached to the wall. The back end portion 14 includes a terminal block 20, having a terminal connection to 24 volt AC power source. This power source is usually located in the system being controlled by the thermostat. This system may be a furnace or an air conditioning system. The terminal block also includes several terminals for receiving or sending signals to the system being controlled.

Referring to the main body portion 12, it is seen that the front of this main body portion includes an LCD display 22 and a series of depressable buttons on a keypad 24 for entering information into the thermostat. A hinged door 26 is normally closed so as to allow for viewing of the LCD display 22 and access to the keypad such as 24.

Figure 2:
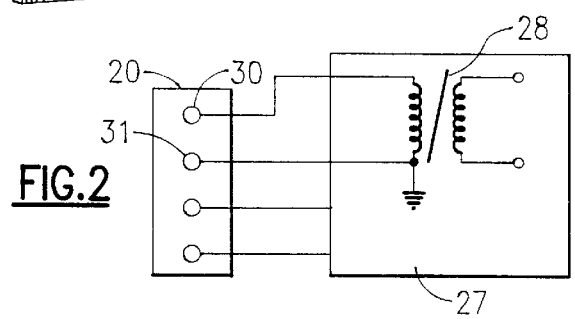
FIG. 2 illustrates the electrical connections of the back end portion of the electronic thermostat to an alternating current source.

FIG. 2 illustrates electrical wiring between the terminal block 20 and the system being controlled. A step down transformer 28 within the system 27 being controlled by the thermostat provides 24 volt AC power to terminals 30 and 31 of the terminal block 20. It is to be appreciated that the step down transformer 28 may not necessarily be located within the system 27 that is to be controlled by the thermostat 10.

Figure 3:
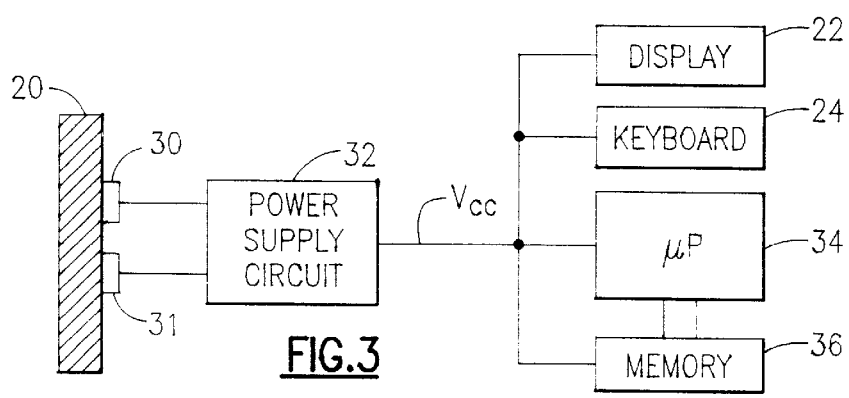
FIG. 3 illustrates a power supply circuit connected to the back end portion of the thermostat and, moreover, connected to various components within the electronic thermostat needing a particular level of DC voltage.

Referring now to FIG. 3, a schematic depiction of various components of the electronic thermostat 10 contained within the main body portion 12 are shown relative to the terminal block 20. In particular, a power supply circuit 32 receives the 24 volt AC power from the terminals 30 and 31 of the terminal block 20. The power supply circuit 32 provides a low voltage, $V_{cc}$, to the display 22 as well as the keypad 24 within the main body portion 12. This power supply voltage is also provided to a microprocessor 34 as well as an electrical erasable programmable memory 36 associated with the microprocessor. It is to be understood that the microprocessor 34 controls what is displayed on the display 22 as well as reads entries from the keypad 24. This is facilitated by a control bus (not shown) for sending and receiving information from the microprocessor to the display 22 and the keypads 24.

Figure 4:
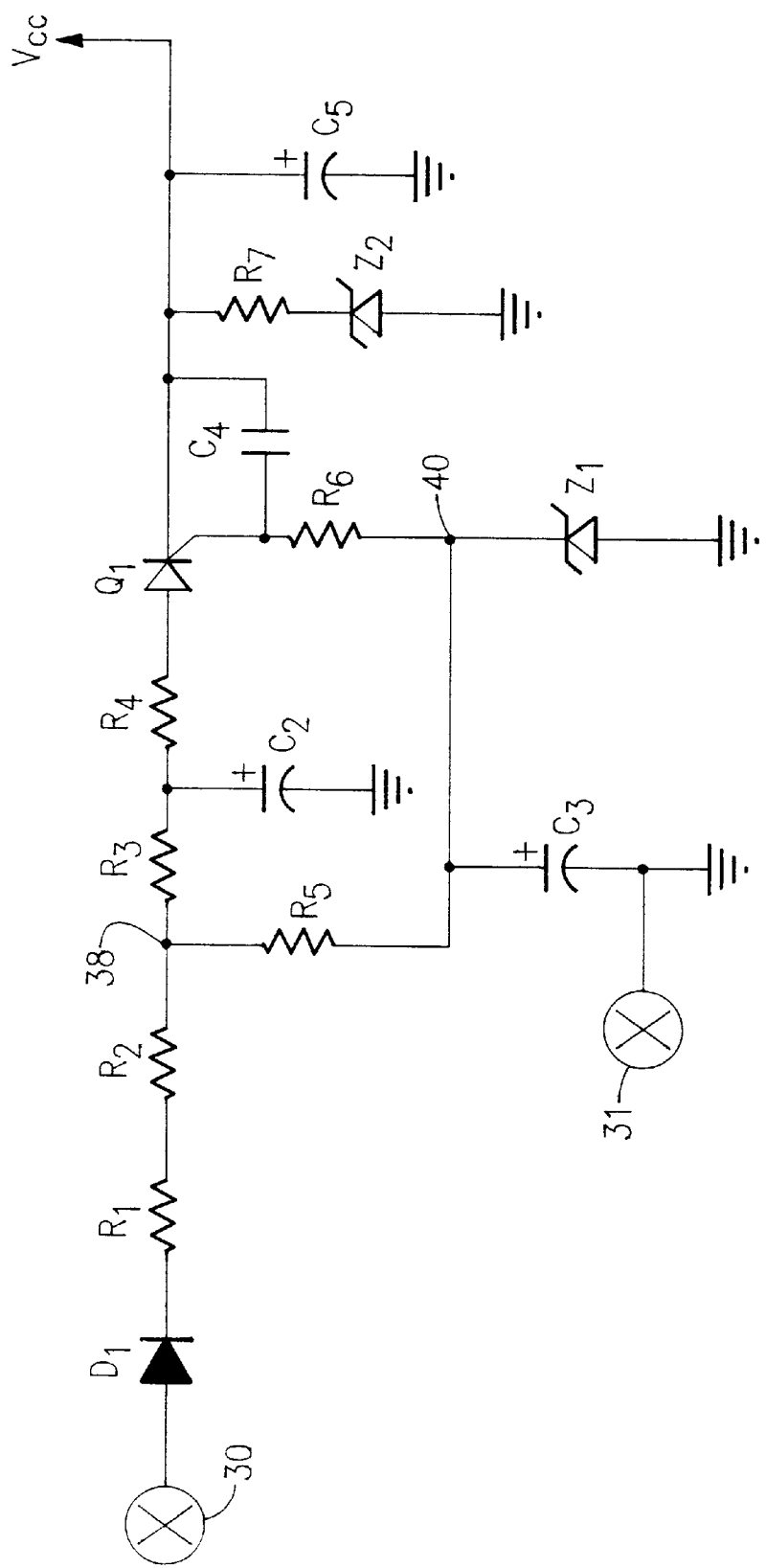
FIG. 4 is a detailed illustration of the power supply circuit of FIG. 3.

Referring now to FIG. 4, the power supply circuit 32 is illustrated in detail. The circuit begins with a diode $D_1$, which acts to half wave rectify the 24 volt AC signal from the terminal 30. Resistors $R_1$ and $R_2$ drop the rectified voltage from the diode $D_1$. The resulting voltage at a point 38 is applied to two different current paths within the power supply circuit. The first current path is through a resistor $R_3$ before splitting into a current path through capacitor $C_2$ to ground as well as a current path through a resistor $R_4$ to the input side of a silicon controlled rectifier $Q_1$. The capacitor $C_2$ in combination with the resistances $R_3$ and $R_4$ filters the voltage from point 38 before applying it to the input of the silicon controlled rectifier $Q_1$.

The second current path from point 38 is through a resistor $R_5$ before partially splitting into a path through capacitor $C_3$ and a path to a point 40. The capacitor $C_3$ normally charges to the voltage at the point 38 less any voltage drop occurring across $R_5$.

The voltage stored in capacitor $C_3$ defines the voltage relative to ground across a zener diode $Z_1$. The zener diode $Z_1$ is also connected through a resistor $R_6$ to a gate of the silicon controlled rectifier $Q_1$.

The difference in the voltage at the gate of $Q_1$ from the voltage at point 40 is merely the voltage drop across the resistor $R_6$. This voltage drop is preferably small if the resistor $R_6$ is appropriately sized so as to limit the current flow to the gate of $Q_1$ when the zener $Z_1$ is not conducting or to ground through the zener $Z_1$ if the zener is conducting. A capacitor $C_4$ connected across the gate and the cathode output of the silicon controlled rectifier prohibits any false triggering of the gate of the silicon controlled rectifier $Q_1$ due to quick surges in current through the resistor $R_6$.

The cathode output of the silicon controlled rectifier is connected to a resistor $R_7$ that is in turn connected to a zener diode $Z_2$. The zener diode $Z_2$ protects the cathode output of the silicon controlled rectifier from dropping below the voltage rating of this zener diode. A capacitor $C_5$ connected across the resistor $R_7$ and the zener $Z_2$ normally defines the voltage, $V_{cc}$, which is provided to the various elements of the thermostat 10. The voltage $V_{cc}$ is also the voltage at the output of the silicon controlled rectifier $Q_1$.

It is to be noted that a particular embodiment of the power supply circuit of FIG. 3 has the following component values:

| | |
|---|---|
| $R_1$ | 50 Ohms |
| $R_2$ | 50 Ohms |
| $R_3$ | 250 Ohms |
| $R_4$ | 250 Ohms |
| $R_5$ | 4.7 K Ohms |
| $R_7$ | .1 K Ohms |
| $R_8$ | 470 Ohms |
| $C_2$ | 10 microfarads |
| $C_3$ | 10 microfarads |
| $C_4$ | .001 microfarad |
| $C_5$ | 100 microfarads |
| $Z_1$ | 4.7 volts |
| $Z_2$ | 5.6 volts |

The diode $D_1$ is preferably an IN4007. The silicon controlled rectifier $Q_1$ is preferably a sensitive gate rectifier with a two hundred volt reverse breakdown. The particular silicon controlled rectifier used in the preferred embodiment is a PO102BL available from STMicroelectronics.

Figure 5A:
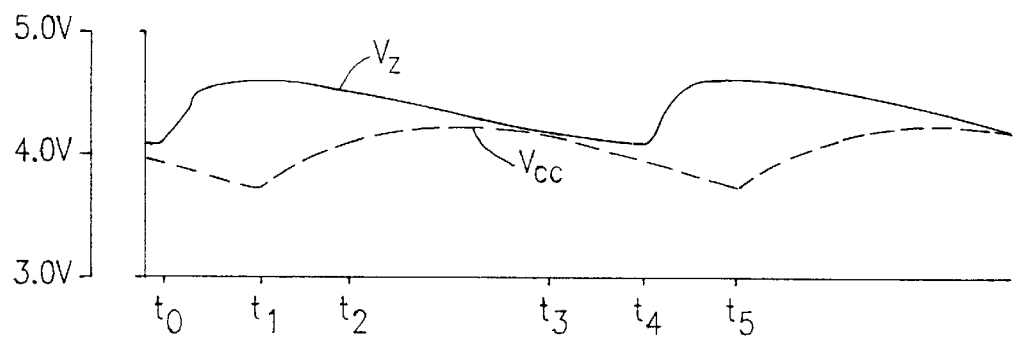
FIG. 5A illustrates voltage levels at certain points within the power supply circuit of FIG. 4.
Figure 5B:
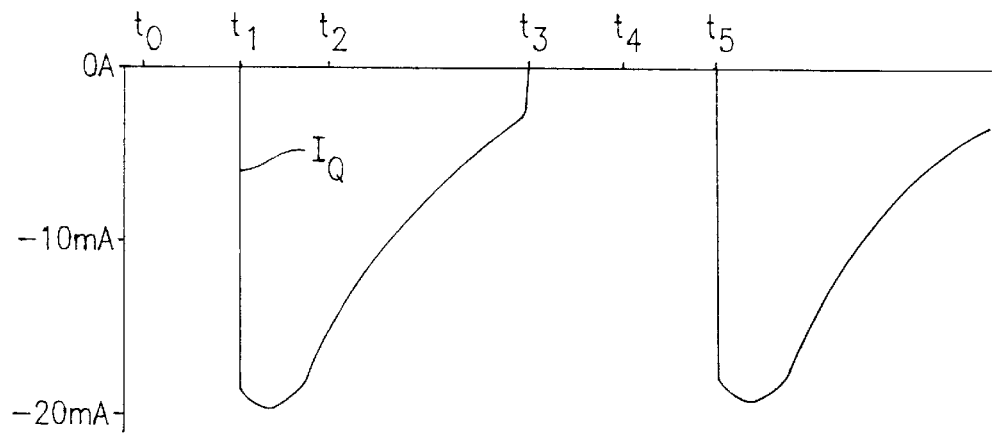
FIG. 5B illustrates the current at one point within the power supply circuit of FIG. 4.
Figure 5C:
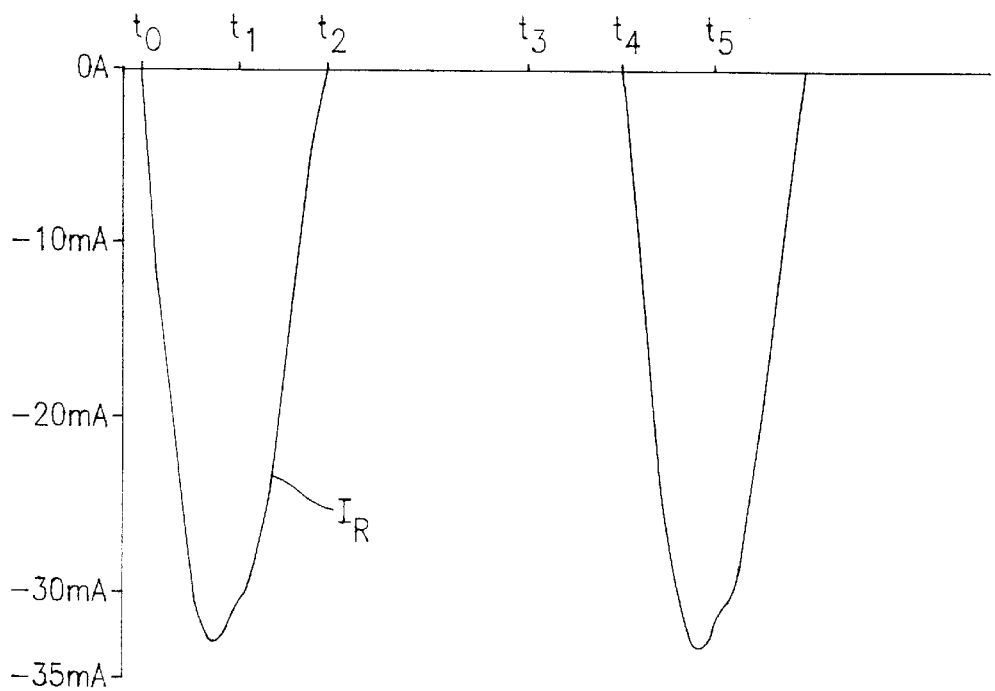
FIG. 5C illustrates the current at another point within the power supply circuit if FIG. 4.

The operation of the circuit of FIG. 4 when the components have the particular values as set forth above will now be described relative to FIGS. 5A, 5B and 5C. In this regard, FIG. 5A illustrates the zener diode voltage $V_z$ versus time at the point 40 of FIG. 4. FIG. 5A also illustrates the voltage $V_{cc}$ versus time at the cathode output of the silicon controlled rectifier $Q_1$. FIG. 5B illustrates the anode to cathode current $I_Q$ through the silicon controlled rectifier $Q_1$ versus time FIG. 5C illustrates the current $I_R$ through the dropping resistors $R_1$ and $R_2$ versus time.

At time $t_0$ the half wave rectifier diode $D_1$ begins to conduct thereby initiating a rectified half wave voltage cycle. Because the silicon controlled rectifier $Q_1$ is pinched off and not conducting, all the current $I_R$ initially flowing through $R_2$ is charging capacitors $C_2$ and $C_3$. Capacitor $C_2$ will define the voltage applied to the anode input of the silicon controlled rectifier $Q_1$. Capacitor $C_3$ will be used to establish the voltage across the zener diode $Z_1$. This voltage will hereinafter be referred to as $V_z$.

At time $t_1$, $V_{cc}$ is sufficiently below $V_z$ so that current flowing through the resistor $R_6$, to the gate of the silicon controlled rectifier $Q_1$ causes $Q_1$ to conduct. The anode to cathode current $I_Q$ through the silicon controlled resistor $Q_1$ quickly goes from zero to nearly minus twenty milliamperes shortly thereafter, as shown in FIG. 5B. At this time, $V_{cc}$ begins to rise as capacitor $C_4$ is charged up by the current $I_Q$. At the same time $V_z$ begins to dip a little as the gate of $Q_1$ draws current from capacitor $C_3$. The current $I_Q$ through the silicon controlled rectifier $Q_1$ is now falling as capacitor $C_5$ is charged up from the capacitor $C_2$ thereby causing the charge on $C_2$ to become depleted. $V_{cc}$ rises and then falls off a little as the charge on capacitor $C_2$ is depleted.

At time $t_2$, the current $I_R$ through the dropping resistors $R_1$ and $R_2$ has dropped back to zero and the capacitors $C_2$ and $C_3$ are both charged up. The current through the dropping resistors $R_1$ and $R_2$ stays at zero until $t_4$ when the cycle repeats, as shown in FIG. 5C. Because the current through resistors $R_1$ and $R_2$ is primarily charging the capacitors $C_2$ and $C_3$, the amplitude of the current pulse is shorter and the width of the current pulse is substantially narrower than it would be for a linear pass transistor power supply. This reduced current pulse reduces the heat generated in the dropping resistors, $R_1$ and $R_2$.

At time $t_3$, voltages $V_{cc}$ and $V_z$ are sufficiently close so that the current to the gate of the silicon controlled rectifier $Q_1$ is pinched off thereby causing the silicon controlled rectifier $Q_1$ to stop conducting, as shown in FIG. 5B. $V_{cc}$ is falling at this time because the circuits of the thermostat are drawing power from the capacitor $C_4$ while it is not being charged because the silicon controlled rectifier $Q_1$ is not conducting. The voltage $V_z$ levels off because there is not any current to the gate of the silicon controlled rectifier $Q_1$, which would discharge capacitor $C_3$. $V_z$ rises again at time $t_4$ when the next half wave cycle of current through diode $D_1$ charges capacitor $C_3$. The silicon controlled rectifier $Q_1$ however remains off until $V_{cc}$ falls to a point where the current through $R_6$ again flows to the gate of the silicon controlled rectifier $Q_1$ at $t_5$ and the cycle repeats.

It is to be appreciated from the above that a particular embodiment of the invention has been described. Alterations, modifications and improvements by those skilled in the art are intended to be a part of this disclosure even though not expressly stated herein and are intended to be within the scope of the invention. Accordingly, the foregoing description of by way of example only and the invention is to be limited only by the following claims and equivalents thereto.

What is claimed is:

1. A power supply circuit for providing an operating level voltage to components of an electronic thermostat, said power supply circuit comprising:

half wave rectifying means;

resistive means connected to said half wave rectifying means so as to decrease the voltage of the half wave signal produced by said half wave rectifying means;

a gated rectifier means having an input for receiving the decreased voltage half wave signal produced by said resistive means, said gated rectifier means having a gate which is held by gating circuitry to within certain voltage limits whereby the voltage at the output of the gated rectifier means is also held within certain voltage limits, the voltage at the output of said gated rectifier means being the operating level voltage to the components of an electronic thermostat.

2. The power supply circuit of claim 1 wherein the gating circuitry for the gated rectifier means comprises:

a zener diode;

a first resistor connected between said zener diode and the gate of said gated rectifier means;

a second resistor connected to said zener diode and to said first resistor and furthermore being connected to said resistive means so as to provide a current path to the gate of said gated rectifier means.

3. The supply circuit of claim 2 wherein the gating circuitry for the gated rectifier means further comprises:

a capacitor connected to the second resistor of the gating circuitry and to said zener diode, said capacitor being operative to charge to the voltage rating of the zener diode before the zener diode becomes conductive.

4. The power supply circuit of claim 3 wherein the gating circuitry for the gated rectifier means further comprises:

a second capacitor connected to the gate of said rectifier means and to the output of the gated rectifier means.

5. The power supply circuit of claim 1 further comprising:

a resistor and capacitor configuration, connected to said resistive means, and being operative to define the voltage at the input of the gated rectifier means.

6. The power supply circuit of claim 5 furthermore comprising a second capacitor connected to the output of the gated rectifier means so as to define the voltage event at the output of the gated rectifier means to the components of the electronic thermostat.

7. The power supply circuit of claim 6 wherein the gated rectifier means is a silicon controlled rectifier having a gate connected to said gating circuitry.

8. The power supply circuit of claim 1 wherein the gating circuitry for the gated rectifier means further comprises:

a second capacitor connected to the gate of said rectifier means and to the output of the gated rectifier means.

9. The power supply circuit of claim 1 wherein said resistive means is connected to the output of said half wave rectifying means.

10. The power supply circuit of claim 9 further comprising:

a resistor and capacitor configuration, connected to said resistive means, and being operative to define the voltage at the input of the gated rectifier means.

11. The power supply circuit of claim 10 furthermore comprising a second capacitor connected to the output of the gated rectifier means so as to define the voltage event at the output of the gated rectifier means to the components of the electronic thermostat.

12. The power supply circuit of claim 11 wherein the gated rectifier means is a silicon controlled rectifier having a gate connected to said gating circuitry.

* * * * *